(12) United States Patent
Fuchs et al.

(10) Patent No.: US 12,744,252 B2
(45) Date of Patent: Sep. 22, 2026

(54) ENERGY STORAGE CELL AND METHOD FOR THE PRODUCTION THEREOF

(71) Applicant: Bayerische Motoren Werke Aktiengesellschaft, Munich (DE)

(72) Inventors: Franz Fuchs, Munich (DE); Kevin Gallagher, Naperville, IL (US); Martin Hiller, Karlsfeld (DE); Florian Kopp, Moettingen (DE); Christophe Mille, Villard de Lans (FR); Frederik Morgenstern, San Francisco, CA (US); Nikolaos Tsiouvaras, Athens (GR); Seokyoon Yoo, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 535 days.

(21) Appl. No.: 18/276,704

(22) PCT Filed: Jan. 25, 2022

(86) PCT No.: PCT/EP2022/051552
§ 371 (c)(1),
(2) Date: Aug. 10, 2023

(87) PCT Pub. No.: WO2022/171424
PCT Pub. Date: Aug. 18, 2022

(65) Prior Publication Data

US 2024/0120554 A1 Apr. 11, 2024

(30) Foreign Application Priority Data

Feb. 11, 2021 (DE) ..................... 10 2021 103 198.2

(51) Int. Cl.

| | |
|---|---|
| ***H01M 10/0587*** | (2010.01) |
| ***H01M 10/04*** | (2006.01) |
| ***H01M 10/0525*** | (2010.01) |

(52) U.S. Cl.
CPC ... *H01M 10/0587* (2013.01); *H01M 10/0422* (2013.01); *H01M 10/0525* (2013.01); *H01M 2220/20* (2013.01)

(58) Field of Classification Search
CPC ......... H01M 10/0587; H01M 10/0422; H01M 10/0525; H01M 10/049; H01M 50/102;
(Continued)

(56) References Cited

U.S. PATENT DOCUMENTS

2004/0023107 A1 2/2004 Nakanishi et al.
2004/0247999 A1 12/2004 Shirane et al.
(Continued)

FOREIGN PATENT DOCUMENTS

CN 1633721 A 6/2005
CN 101978530 A 2/2011
(Continued)

OTHER PUBLICATIONS

International Search Report (PCT/ISA/210) issued in PCT Application No. PCT/EP2022/051552 dated May 16, 2022 with English translation (5 pages).
(Continued)

*Primary Examiner* — Stewart A Fraser
(74) *Attorney, Agent, or Firm* — Crowell & Moring LLP

(57) ABSTRACT

A method for producing an energy storage cell is provided. According to the method, a housing having a base, a tapping plate, and a wound electrode assembly are provided. The wound electrode assembly is connected to the tapping plate, and the tapping plate, which is connected to the wound electrode assembly, is arranged in the housing. The tapping plate and the base of the housing are connected to each other via laser beam welding.

12 Claims, 4 Drawing Sheets

(58) Field of Classification Search
CPC ............. H01M 50/533; H01M 50/536; H01M 50/545; H01M 50/566; H01M 10/0431
See application file for complete search history.

(56) References Cited

U.S. PATENT DOCUMENTS

| | | | | |
|---|---|---|---|---|
| 2010/0255358 | A1 | 10/2010 | Yoneyama | |
| 2011/0086252 | A1 | 4/2011 | Phillips | |
| 2016/0254565 | A1 | 9/2016 | Wakimoto et al. | |
| 2017/0149046 | A1* | 5/2017 | Urano | H01M 50/578 |
| 2018/0062152 | A1* | 3/2018 | Yoshida | H01M 50/533 |
| 2020/0144686 | A1 | 5/2020 | Jang et al. | |
| 2020/0176750 | A1 | 6/2020 | Funami et al. | |
| 2020/0259133 | A1 | 8/2020 | Tominaga et al. | |
| 2022/0131216 | A1* | 4/2022 | Park | H01M 50/107 |

FOREIGN PATENT DOCUMENTS

| | | | |
|---|---|---|---|
| CN | 110945679 | A | 3/2020 |
| DE | 20 2017 006 038 | U1 | 4/2019 |
| EP | 1 223 592 | A1 | 7/2002 |
| JP | 2004-71267 | A | 3/2004 |
| JP | 2016-173972 | A | 9/2016 |

OTHER PUBLICATIONS

German-language Written Opinion (PCT/ISA/237) issued in PCT Application No. PCT/EP2022/051552 dated May 16, 2022 with English translation (10 pages).

German-language Search Report issued in German Application No. 10 2021 103 198.2 dated Oct. 20, 2021 with partial English translation (11 pages).

Chinese-language Office Action issued in Chinese Application No. 202280011074.8 dated Apr. 25, 2026, with English translation (22 pages).

* cited by examiner 100
50
30
30
20
21
11
12
CL
CL 10
30
30
50
20
12
21
11

10
30
30
20
12
21
11

30
30
20
LL
LL
21

10
12
11

ENERGY STORAGE CELL AND METHOD FOR THE PRODUCTION THEREOF

BACKGROUND AND SUMMARY OF THE INVENTION

The present invention relates to an energy storage cell and a method for the production thereof.

The present invention relates in particular to an energy storage cell, for example, a cylindrical lithium ion energy storage cell, having a housing, in which a current collector formed as a lead plate and at least one wound electrode arrangement connected thereto, which includes a cathode, an anode, and a separator arranged in between, are arranged, wherein the lead plate is connected to a base of the housing.

In such energy storage cells, the connection between the lead plate and the base of the housing, which is used to form a heat conduction and current conduction path, is usually produced by a resistance welding process, in which a bar-shaped electrode is led through a hole located in the center of the wound electrode arrangement and pressed onto the lead plate, and another electrode is arranged at a corresponding position of an outside of the base, and the lead plate and the base are connected by welding by means of a current flow between the electrodes. For this purpose, a stable bar-shaped electrode, for example, a copper electrode, having corresponding diameter is required, in order to enable a sufficient current flow during the resistance welding process and to be able to exert a sufficient force between the lead plate and the housing to establish a reliable connection between them. During this resistance welding process, small particles can arise in the interior of the housing, which can result in a short circuit between the anode and the cathode of the electrode arrangement during the formation of the energy storage cell.

It is an object of the present invention to provide an improved energy storage cell and an improved method for the production thereof.

This object is achieved by the features of the independent patent claims. Further preferred embodiments of the invention are the subject matter of the dependent claims.

A method according to one embodiment for producing an energy storage cell includes:

- providing a housing having a base,
- providing a lead plate,
- providing a wound electrode arrangement,
- connecting the wound electrode arrangement to the lead plate,
- arranging the lead plate connected to the wound electrode arrangement in the housing, and
- connecting the lead plate and the base of the housing by laser beam welding.

Due to the connection of the lead plate and the base of the housing by laser beam welding, in particular in the state in which the lead plate connected to the wound electrode arrangement is arranged in the housing, the laser beam can be directed from the outside onto a lower side of the base of the housing, so that the welding process can be carried out from outside the housing. In this way, the occurrence of small particles in the interior of the housing, which can arise during the conventional resistance welding process, can be avoided.

Furthermore, due to the connection of the lead plate and the base of the housing by laser beam welding, in comparison to the conventional resistance welding method, in which predominantly punctiform weld contacts are produced between the lead plate and the base of the housing, the welding connection section, in particular its size, can be deliberately set by the laser beam and overall the quality of the welded connection can be improved, by which the dissipation of the heat which is generated by the electrode arrangement in operation from the interior of the housing via the lead plate and the base of the housing to the surroundings, and the electrical conductivity from the electrode arrangement via the lead plate to the base of the housing can be improved. Moreover, the quality of the laser welding connection can advantageously be checked from outside the housing, for example, visually checked.

In addition, the hole in the center of the electrode arrangement, through which the one electrode is led in the resistance welding method in order to apply pressure to the lead plate and supply the current for the resistance welding, can be significantly reduced in size, since an electrode does not have to be led through the hole in laser beam welding in order to supply the current to the lead plate, and pressing the lead plate in the direction of the base of the housing is not required or is required to a significantly lesser extent than in the resistance welding method. In this way, a larger amount of active material can be housed in the housing, by which the performance of the energy storage cell can be increased.

According to one embodiment, providing the housing includes providing a housing having a base, in which a hole is provided, providing the lead plate includes providing a lead plate having a projection, and arranging the lead plate connected to the wound electrode arrangement in the housing includes inserting at least sections of the projection of the lead plate into the hole of the base of the housing.

The lead plate can be centered together with the electrode arrangement connected thereto in a simple manner inside the housing by this embodiment.

In this case, the connection of the lead plate and the base of the housing by laser beam welding can include connecting the projection of the lead plate and the base of the housing by laser beam welding, in which a section of an outside of the base, which adjoins the hole, and an exposed section of the projection are irradiated using a laser beam.

In this way, it can be ensured that no or at least very few particles arise in the interior of the housing due to the laser welding process, which could result in a short circuit during the forming.

Preferably, providing the housing includes providing a housing having a base, in which at least one recess is provided, providing the lead plate includes providing a lead plate having at least one bulge, and arranging the lead plate connected to the wound electrode arrangement in the housing includes inserting at least sections of the at least one bulge into the at least one recess.

In this way, the contact surface between the lead plate and the base of the housing can advantageously be increased, and the arrangement of the lead plate or its sections which include the bulge relative to the base of the housing can be set in a simple manner. The bulges and the recesses can be formed here in such a way that the lead plate and the base of the housing are connected to one another in a formfitting manner.

In this case, connecting the lead plate and the base of the housing by laser beam welding can include irradiating an outside of the base, in a section of the base which includes the at least one recess, using a laser beam.

Furthermore, in this case providing the lead plate can include providing a lead plate having at least one elevation, which extends originating from a first side, which faces away from a second side of the lead plate, originating from which the at least one bulge extends, of the lead plate, and connecting the wound electrode arrangement to the lead plate can include connecting the at least one elevation of the lead plate to the wound electrode arrangement by laser beam welding.

In this case, the elevations and the bulges are preferably arranged offset in relation to one another in order to prevent irradiation of a section two times using the laser beam, one time during the connection of the lead plate to the electrode arrangement and the other time during the connection of the lead plate to the base of the housing.

According to one preferred embodiment, providing the housing includes providing a housing which is provided with a notch, wherein during the connection of the lead plate and the base of the housing by laser beam welding, a laser beam is aligned using the notch on a specified position on the base and/or a specified position on the lead plate.

In this way, in the case that the base includes the recesses, into which the bulges are inserted, the areas of the base of the housing to be irradiated using the laser beam can be set in a simple manner.

Furthermore, in the method, providing the housing can include simultaneously introducing the recess and the notch into the housing, in particular by means of an embossing tool. In this way, deviations from specifications with respect to the position relationship between the notch and the recesses can be avoided.

An energy storage cell according to one embodiment includes:

a housing having a base, a lead plate, a wound electrode arrangement, wherein the wound electrode arrangement is connected to the lead plate, the lead plate having the wound electrode arrangement connected thereto is arranged in the housing, and the lead plate and the base of the housing are connected by laser beam welding.

A hole is preferably provided in the base of the housing, wherein the lead plate includes a projection which is inserted at least in sections into the hole of the base of the housing.

In this case, the projection of the lead plate and the base of the housing can be connected by irradiating a section of an outside of the base, which adjoins the hole, and an exposed section of the projection using a laser beam.

The housing preferably includes a base, in which at least one recess is provided, wherein the lead plate includes at least one bulge, and the at least one bulge is inserted at least in sections into the at least one recess.

In this case, the lead plate and the base of the housing can be connected by irradiating an outside of the base, in a section of the base which includes the at least one recess, using a laser beam.

Furthermore, in this case the lead plate can include at least one elevation, which extends originating from a first side, which faces away from a second side of the lead plate, originating from which the at least one bulge extends, of the lead plate, wherein the at least one elevation of the lead plate is connected to the wound electrode arrangement by laser beam welding.

A vehicle, in particular a hybrid or electric vehicle, according to one embodiment includes an above-described energy storage cell, which is connected to a drive motor in order to supply the drive motor with electrical energy.

Further advantageous refinements of the present invention result from the following description of preferred embodiments. In the figures, some of which are schematic:

DETAILED DESCRIPTION OF THE DRAWINGS

Figure 1:
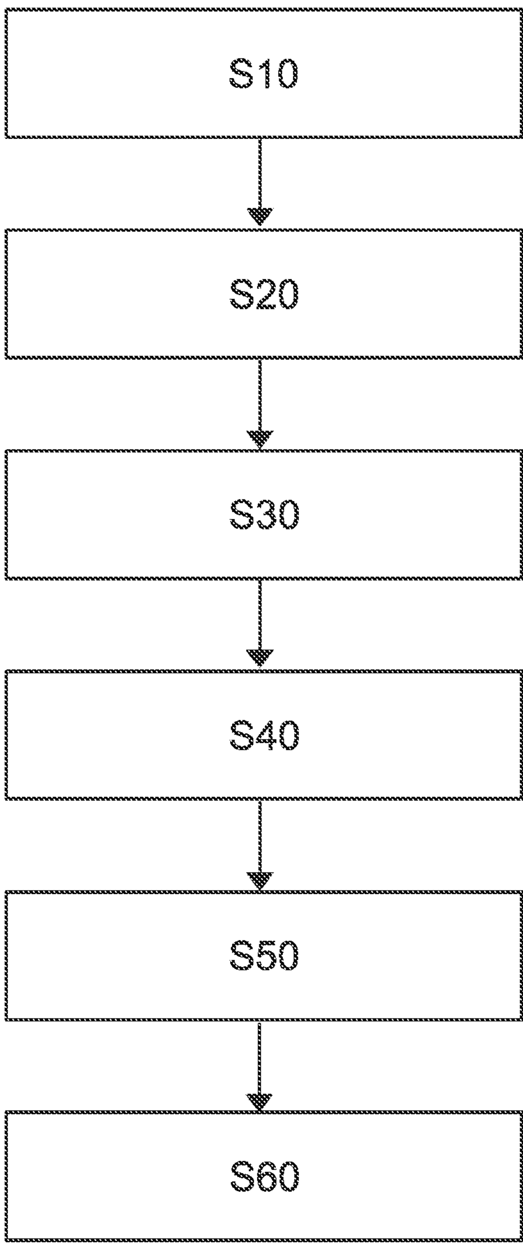
FIG. 1 shows a flow chart to illustrate a method according to one embodiment for producing an energy cell according to one embodiment.

FIG. 1 shows a flow chart to illustrate a method for producing an energy storage cell according to one embodiment.

In the method for producing an energy storage cell 100, 100', in particular a cylindrical lithium-ion energy storage cell, in a step S10, a housing 10, 10' having a base 11, 11' is provided, in a step S20, a current collector formed as a lead plate 20, 20' is provided, and in a step S30, a wound electrode arrangement 30, 30' is provided.

Figures 2A, 2B, 2C, 2D, 2E:
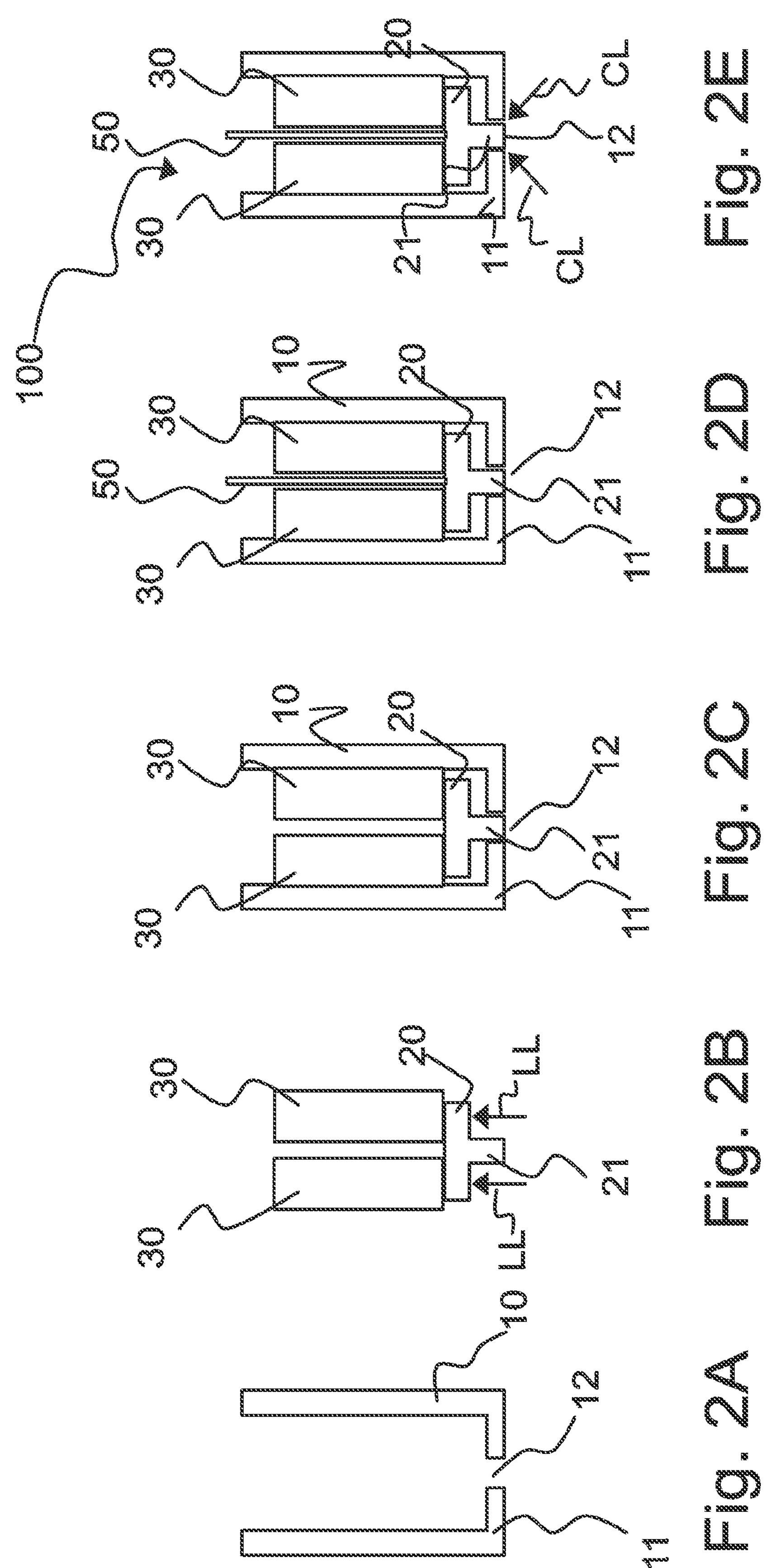
FIGS. 2A-2E show parts of an energy storage cell according to one embodiment in different phases of the production thereof.
Figures 3A, 3B:
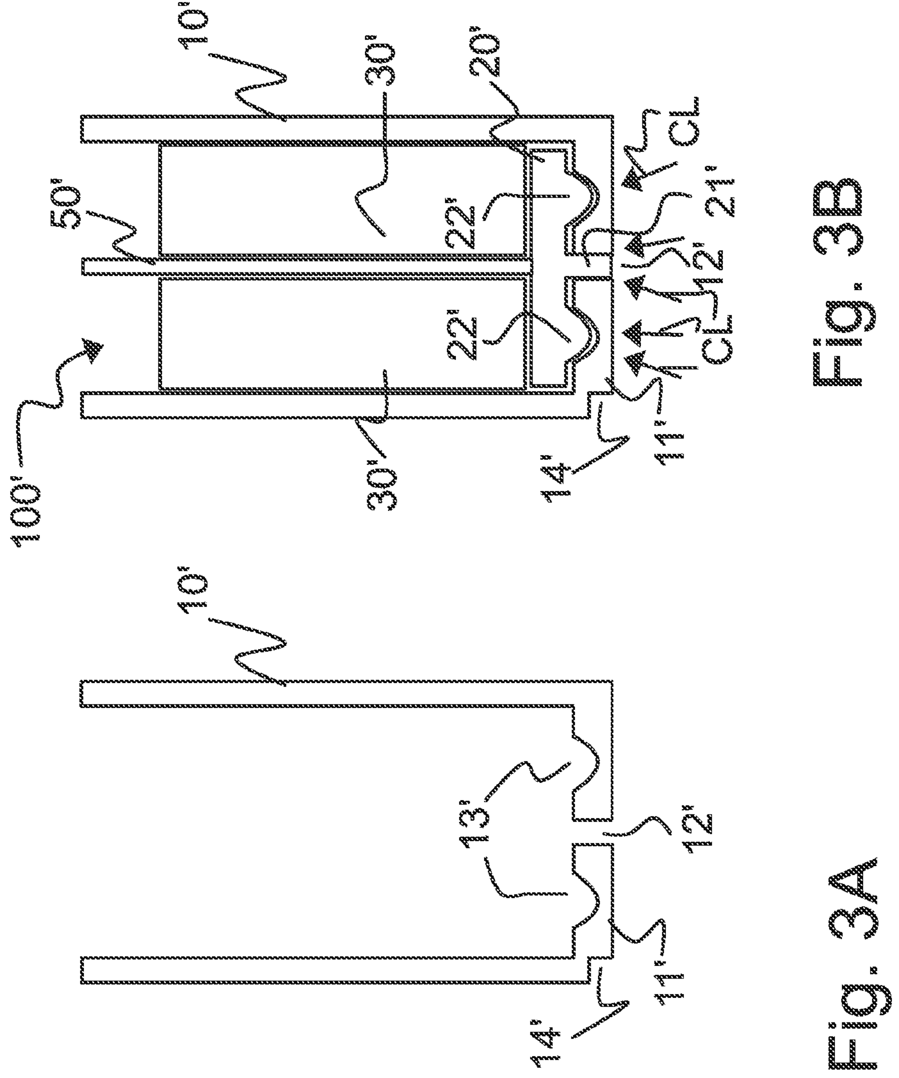
FIGS. 3A, 3B show parts of an energy storage cell according to another embodiment in different phases of the production thereof.

The wound electrode arrangement 30, 30', which includes a cathode (not shown), an anode (not shown), and a separator (not shown) arranged in between, is connected in a step S40 to the lead plate 20, 20', for example, by means of a linear laser welding method, as indicated in FIG. 2B by the reference sign "LL", and in step S50, the lead plate 20, 20' connected to the wound electrode arrangement 30, 30' is arranged in the housing 10, 10'. Then, in a step S60, the lead plate 20, 20' and the base 11, 11' of the housing 10, 10' are connected by laser beam welding, in particular by circular laser beam welding or circle laser beam welding, as indicated in FIGS. 2E and 3B by the reference sign "CL". In this case, as illustrated in FIGS. 2D, 2E, and 3B, the lead plate 20, 20' can be pressed, using a suitable aid, for example, a bar-shaped element 50, 50', which is led through a hole located in the center of the wound electrode arrangement 30, 30', in the interior of the housing 10, 10' in the direction of the base 11, 11' and held in this position. The use of the bar-shaped element 50, 50' for pressing the lead plate 20, 20' is optional, however, and even if the bar-shaped element 50, 50' is used, it is removed before finishing the energy storage cell 100, 100', so that it is not part of the finished energy storage cell 100, 100'.

With reference to FIGS. 2A and 3A, providing the housing 10, 10' having a base 11, 11' in step S10 can include providing a housing 10, 10' having a base 11, 11', in which a hole 12, 12' is provided.

Furthermore, with reference to FIGS. 2B and 3B, providing the lead plate 20, 20' in step S20 can include providing a lead plate 20, 20' having a projection 21, 21', and with reference to FIGS. 2C and 3B, arranging the lead plate 20, 20' connected to the wound electrode arrangement 30, 30' in the housing 10, 10' in step S50 can include inserting at least sections of the projection 21, 21' of the lead plate 20, 20' into the hole 12, 12' of the base 11, 11' of the housing 10, 10'.

In this case, during the connection of the lead plate 20, 20' and the base 11, 11' of the housing 10, 10' by laser beam welding in step S60, a section, in particular a circular section, of an outside of the base 11, 11', which adjoins the hole 12, 12', and an exposed section of the projection 21, 21', which adjoins the edge of the hole 12, 12', can be irradiated using a laser beam, as illustrated in FIGS. 2E and 3B on the basis of the reference sign "CL".

With reference to FIGS. 3A and 3B, in step S10, a housing 10' having a base 11' can be provided in which at least one recess 13' is provided, and in step S20, a lead plate 20' having at least one bulge 22' can be provided. In this case, in step S50, during the arrangement of the lead plate 20' connected to the wound electrode arrangement 30' in the housing 10', the at least one bulge 22' can be inserted at least in sections, preferably in a formfitting manner, into the at least one recess 13'.

In this case, during the connection of the lead plate 20' and the base 11' of the housing 10' by laser beam welding in step S60, an outside of the base 11' can be irradiated, in a section of the base 11' which includes the at least one recess 13', using a laser beam.

Figure 4:
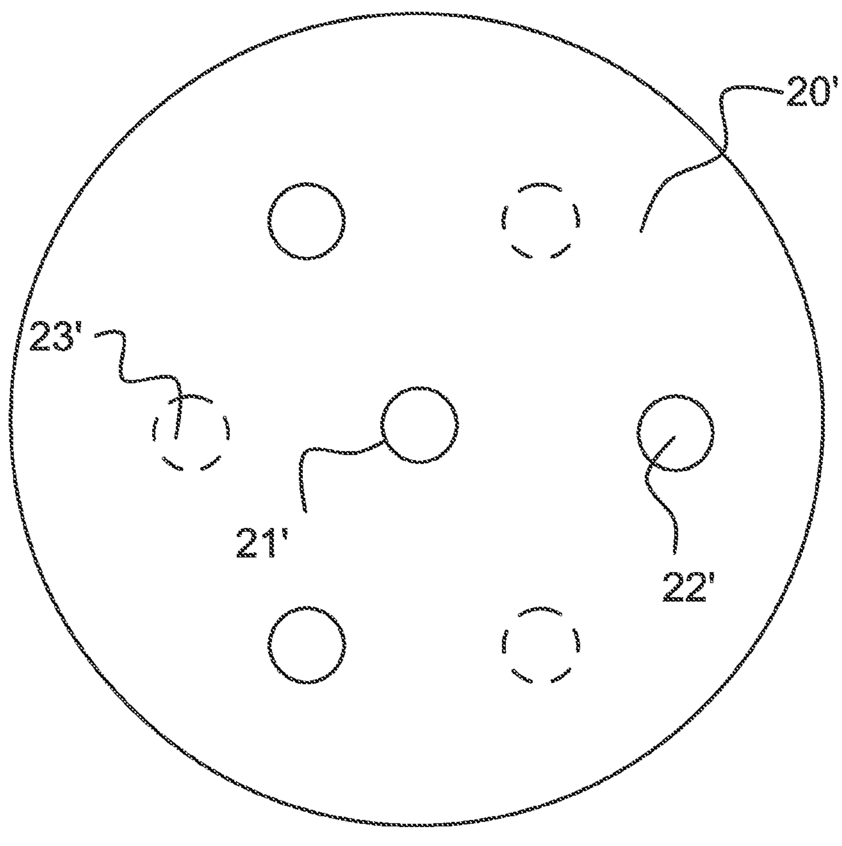
FIG. 4 shows a lead plate of an energy storage cell according to one embodiment.

Furthermore, in this case in step S20 with reference to FIG. 4, which shows a schematic top view of one side of the lead plate 20', which faces toward the base 11, 11' in the state arranged in the housing 10, 10', a lead plate 20' having at least one elevation 23' can be provided, which extends originating from a first side, which faces away from a second side of the lead plate 20', originating from which the at least one bulge 22' extends, of the lead plate 20'. During the connection of the wound electrode arrangement 30' to the lead plate 20' in step S40, the at least one elevation 23' of the lead plate 20' can be connected to the wound electrode arrangement 30' by laser beam welding here.

As illustrated in FIG. 4, the elevations 23' and the bulges 22' on the first side and the second side of the lead plate 20' are in particular arranged offset in relation to one another, to prevent the same sections of the lead plate 20' having to be irradiated using the laser beam for the connection of the wound electrode arrangement 30' to the lead plate 20' in step S40 and for the connection of the lead plate 20' and the base 11' of the housing 10' in step S60 by laser beam welding, which would result in material weakening of the corresponding sections.

With reference to FIGS. 3A and 3B, in step S10, a housing 10' can additionally be provided, which is provided with a notch 14', which can be arranged, for example, as illustrated in FIGS. 3A and 3B, at or in an edge of the lower side of the base 11'. In this case, during the connection of the lead plate 20' and the base 11' of the housing 10' by laser beam welding in step S60, a laser beam can be aligned using the notch 14' on a specified position on the base 11' or its exposed lower side, which corresponds, for example to the recess 13', and/or a specified position on the lead plate 20', which corresponds, for example, to the bulge 22'.

The invention claimed is:

1. A method for producing an energy storage cell comprising:

providing a housing having a base;

providing a lead plate;

providing a wound electrode arrangement;

connecting the wound electrode arrangement to the lead plate;

arranging the lead plate connected to the wound electrode arrangement at a bottom of the housing, the lead plate including a projection projecting downward toward the bottom of the housing and at least one bulge projecting downward toward the bottom of the housing;

wherein a hole is provided in the base of the housing, and the projection of the lead plate is inserted at least in sections into the hole of the base of the housing; and connecting the lead plate and the base of the housing by laser beam welding.

2. The method according to claim 1, wherein connecting the lead plate and the base of the housing by laser beam welding includes connecting the projection of the lead plate and the base of the housing by laser beam welding, in which a section of an outside of the base, which adjoins the hole, and an exposed section of the projection are irradiated using a laser beam.

3. The method according to claim 1, wherein providing the housing includes providing the housing having the base, in which at least one recess is provided, and arranging the lead plate connected to the wound electrode arrangement in the housing includes inserting at least sections of the at least one bulge into the at least one recess.

4. The method according to claim 3, wherein connecting the lead plate and the base of the housing by laser beam welding includes irradiating an outside of the base, in a section of the base which includes the at least one recess, using a laser beam.

5. The method according to claim 3, wherein providing the lead plate includes providing the lead plate having at least one elevation, which extends originating from a first side, which faces away from a second side of the lead plate, originating from which the at least one bulge extends, of the lead plate, and connecting the wound electrode arrangement to the lead plate includes connecting the at least one elevation of the lead plate to the wound electrode arrangement by laser beam welding.

6. The method according to claim 1, wherein providing the housing includes providing the housing, which is provided with a notch, and during the connection of the lead plate and the base of the housing by laser beam welding, a laser beam is aligned using the notch on a specified position on the base and/or a specified position on the lead plate.

7. An energy storage cell comprising:

a housing having a base;

a lead plate disposed at a bottom of the housing and including a projection projecting downward toward the bottom of the housing and at least one bulge projecting downward toward the bottom of the housing;

a wound electrode arrangement;

wherein the wound electrode arrangement is connected to the lead plate, the lead plate having the wound electrode arrangement connected thereto is arranged in the housing, and the lead plate and the base of the housing are connected by laser beam welding; and wherein a hole is provided in the base of the housing, and the projection of the lead plate is inserted at least in sections into the hole of the base of the housing.

8. The energy storage cell as claimed in claim 7, wherein the projection of the lead plate and the base of the housing are connected by irradiating a section of an outside of the base, which adjoins the hole, and an exposed section of the projection using a laser beam.

9. The energy storage cell according to claim 7, wherein the housing includes a base, in which at least one recess is provided, and the at least one bulge is inserted at least in sections into the at least one recess.

10. The energy storage cell according to claim 9, wherein the lead plate and the base of the housing are connected by irradiating an outside of the base, in a section of the base which includes the at least one recess, using a laser beam.

11. The energy storage cell according to claim 9, wherein the lead plate includes at least one elevation, which extends originating from a first side, which faces away from a second side of the lead plate, originating from which the at least one bulge extends, of the lead plate, and the at least one elevation of the lead plate is connected to the wound electrode arrangement by laser beam welding.

12. A hybrid vehicle or an electric vehicle, including an energy storage cell according to claim 7, which is connected to a drive motor in order to supply the drive motor with electrical energy.

* * * * *